US006469094B1

(12) United States Patent
Keoshkerian et al.

(10) Patent No.: US 6,469,094 B1
(45) Date of Patent: Oct. 22, 2002

(54) POLYMERIZATION PROCESSES

(75) Inventors: Barkev Keoshkerian, Thornhill (CA); Paula J. MacLeod, Etobicoke (CA); Peter G. Odell, Mississauga (CA); Michael K. Georges, Guelph (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/561,208

(22) Filed: Apr. 28, 2000

(51) Int. Cl.⁷ .................................................. C08J 3/07
(52) U.S. Cl. ...................... 524/502; 524/505; 524/552; 524/567; 524/575; 526/227; 526/229
(58) Field of Search ................................ 526/227, 229; 524/502, 505, 552, 567, 575

(56) References Cited

U.S. PATENT DOCUMENTS

| | | | |
|---|---|---|---|
| 4,385,157 A | 5/1983 | Auclair et al. ............... 525/316 |
| 5,006,617 A | 4/1991 | Engel et al. .................... 526/87 |
| 5,686,518 A | 11/1997 | Fontenot et al. ............ 524/458 |
| 5,852,140 A * | 12/1998 | Georges et al. ............... 526/82 |
| 5,891,971 A * | 4/1999 | Keoshkerian et al. ....... 526/210 |

* cited by examiner

Primary Examiner—David W. Wu
Assistant Examiner—William K. Cheung
(74) Attorney, Agent, or Firm—Robert Thompson

(57) ABSTRACT

A process for latex preparation including:

a first heating of a mixture of at least one free radical polymerizable monomer compound, a free radical initiator compound, and a stable free radical compound to form a latomer mixture with from about 1 to about 8 percent conversion of the monomer compound to an oligomeric compound of the formula I—R'—SFR, wherein R' is an oligomer comprised of from about 1 to about 30 monomer units, I— is a covalently bonded free radical initiator fragment arising from the free radical initiator compound, and —SFR is a covalently bound stable free radical group; dispersing the resulting latomer mixture in water with high shear to form a miniemulsion; and a second heating of the miniemulsion, wherein there results a high stability polymer particle latex which contains a polymer with a high monomer to polymer conversion of from about 98 to about 100 weight percent and a narrow polydispersity of from about 1.1 to about 2.0.

20 Claims, No Drawings

POLYMERIZATION PROCESSES

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,545,504, issued Jul. 13, 1996, entitled "INK JETTABLE TONER COMPOSITIONS AND PROCESSES FOR MAKING AND USING"; U.S. Pat. No. 5,530,079, issued Jun. 26, 1996, entitled "POLYMERIZATION PROCESSES"; U.S. Pat. No. 5,552,502, issued Sep. 3, 1996, entitled "POLYMERIZATION PROCESSES"; U.S. Pat. No. 5,608,023, issued Mar. 4, 1997, entitled "RATE ENHANCED POLYMERIZATIONS"; U.S. Pat. No. 5,773,510, issued Jun. 30, 1998, entitled "PROCESSES FOR THE PREPARATION OF BRANCHED POLYMERS"; and U.S. Pat. No. 5,852,140, issued Dec. 22, 1998, to Georges, et al., entitled "SEMISUSPENSION POLYMERIZATION PROCESSES."

Attention is directed to commonly owned and assigned copending applications application numbers, U.S. Ser. No. 08/892,860, filed Jul. 14, 1997 U.S. Pat. No. 6,121,397 Sep. 19, 2000, entitled "POLYMERIZATION PROCESSES", which discloses, for example, a process for the preparation of a thermoplastic resin, or thermoplastic resins comprising: forming, or providing a miniemulsion comprised of a mixture of an oligomeric compound of the formula R—SFR, wherein R is an oligomeric compound comprised of from about 1 to about 30 monomer units and optionally a covalently bonded free radical initiator compound, —SFR is a covalently bound stable free radical end group, and at least one free radical polymerizable monomer compound, and a surfactant; and heating the miniemulsion wherein there results a latex thermoplastic resin or a latex of thermoplastic resins with a high monomer to polymer conversion of about 85 to about 100 percent and a narrow polydispersity of from about 1.1 to about 2.0; U.S. Ser. No. 08/214,518, filed Mar. 18, 1994 abandoned Nov. 21, 2000, entitled "EMULSION POLYMERIZATION PROCESSES AND TONER COMPOSITIONS THEREFROM", a continuation-in-part of U.S. Ser. No. 07/976,604, filed Nov. 16, 1992 U.S. Pat. No. 5,322,912 Jun. 21, 1994 ; and U.S. Ser. No. 08/223,418 (D/93729), filed Apr. 4, 1994 abandonded Nov. 21, 2000, entitled "AQUEOUS POLYMERIZATION PROCESSES."

The disclosures of each the above mentioned patents and copending applications are incorporated herein by reference in their entirety. The appropriate components and processes of these applications may be selected for the toners and processes of the present invention in embodiments thereof.

BACKGROUND OF THE INVENTION

The present invention is generally directed to a processes for the preparation of polymeric particulate materials with narrow particle size distribution properties and containing polymeric resin with narrow molecular weight distribution properties. More specifically, the present invention relates to processes for the preparation of polymeric particulate materials with improved reliability and yield, that is conversion of monomers to polymers, that provide highly stable latexes (latices) and to improved control over the resulting latex particle size and latex particle size distribution properties.

The present invention also relates to processes for the preparation of polymers, and more specifically to a two stage semi-emulsion process that includes a first bulk polymerization where controlled initiation and limited or partial monomer polymerization is accomplished for the purpose of preparing a prepolymer mixture followed by a second stage mini-emulsion polymerization where substantially complete monomer polymerization is accomplished. The present invention also relates to the polymeric resins, highly stable and versatile latices containing the polymeric resins, and useful latex particulate materials formed by the aforementioned processes.

Emulsion polymerization processes are known in the art, as illustrated hereinafter. Conventional emulsion polymerization processes proceed by a free radical mechanism providing resins of broad polydispersities and generally high molecular weights. The present invention relates to a semi-emulsion polymerization process that proceeds via a pseudo-living free radical mechanism and provides resins of high, intermediate, or low molecular weights and with narrow polydispersities. The present invention provides product resins with a latent thermally reactive functional group on at least one end which can be used for further reaction to prepare other resins with complex architectures. The present invention, in embodiments, provides for control of the emulsion droplet size and the resultant polymer resin bead or particle size, for example, as disclosed in the aforementioned commonly owned and assigned U.S. Pat. No. 5,852,140.

Emulsion polymerization processes are industrially important, and are the predominant process for the synthesis of a number of copolymers, such as for example styrene/butadiene. However, resins prepared by emulsion polymerization processes typically have broad polydispersities and high molecular weights. When low molecular weight resins are desired, a chain transfer agent is typically added to limit the extent of chain growth by way of premature chain termination events and which agent is, for example, an unpleasant smelling thiol compound. Polymers prepared by thiol type chain transfer mediated emulsion polymerization processes are terminated at either end with functional groups which preclude further free radical reactions and therefore limit the utility of the polymer resin products produced therefrom.

The present invention is directed to semi-emulsion polymerization processes which permit the economic preparation of high stability polymer particle latices containing narrow polydispersity resins with operator selectable low, intermediate, or high molecular weights. The low molecular weight polymer resins can be prepared without a chain transfer agent or molecular weight modifier and thereby provides several advantages over conventional emulsion polymerization processes as illustrated herein.

PRIOR ART

In U.S. Pat. No. 5,686,518, issued Nov. 11, 1997, Fontenot, et al., there is disclosed an essentially stable monomer miniemulsion characterized by small monomer droplet size is prepared and is then polymerized to a polymer latex under free radical polymerization conditions. The monomer miniemulsions herein include, in addition to water, a surfactant, and a monomer or mixture thereof, one or more polymers which function as a polymeric co-surfactant. The monomer miniemulsions are characterized by average monomer droplet size of 10 to 500 nanometers, preferably 80 to 150 nanometers. The amount of polymer added as a co-surfactant is about 0.5 to about 5 percent by weight based on monomer weight. The monomer emulsion may contain either a single monomer or a monomer mixture. The monomer emulsion is polymerized under conventional emulsion polymerization conditions yielding a polymer latex having an average polymer particle size of 10 to 500 nanometers, preferably 80 to 150 nanometers, and a narrow particle size distribution, i.e., a polydispersity index of about 1.05 to about 1.40. A representative monomer is methyl methacrylate and a representative polymer as co-surfactant is polymethyl methacrylate.

In U.S. Pat. No. 5,852,140, issued Dec. 22, 1998, to Georges, et al., there is disclosed a process for the preparation of a polymer which comprises effecting bulk polymerization of a mixture of at least one monomer, a free radical polymerization initiator, and a stable free radical agent until from about 10 to about 50 weight percent of the monomer has been polymerized(i.e. latomer mixture); optionally adding additional free radical initiator; optionally adding a colorant; dispersing with a high shear mixer the aforementioned partially polymerized mixture in water containing a stabilizing component selected from the group consisting of non-ionic and ionic water soluble polymeric stabilizers to obtain a suspension of particles with an average diameter of from about 0.1 to about 10 microns; and polymerizing the resulting suspension to form the polymer.

U.S. Pat. No. 5,006,617 issued Apr. 9, 1991, and U.S. Pat. No. 4,665,142 issued May 12, 1987, both to Engel et al., disclose the preparations of polymers free from emulsifiers and protective colloids by the free-radical initiated emulsion polymerization of ethylenically unsaturated copolymerizable monomers, wherein the emulsion polymerization is carried out in the absence of emulsifiers and protective colloids, using water-soluble, free-radical forming initiators and with the addition, at least at the start of the polymerization, of at least 0.01% by weight, based on the total amount of monomers, of poly-(ethylenically unsaturated) monomers, and the polymers can be obtained in the form of aqueous or non-aqueous dispersions or in the form of powder. The use of the polymers in the form of dispersions or powders is for modifying polymer materials and polymer raw materials and for the production of shaped articles and films.

U.S. Pat. No. 4,385,157 issued May 24, 1983, to Auclair et al., discloses a novel emulsion polymerization process for preparing a latex of rubber particles having a bimodal rubber particle size distribution of large and small particles followed by grafting said rubber particles with a monomer mixture forming a poly-blend of said grafted rubber particles and a matrix phase polymer of said monomers.

Bon et al., disclose a controlled radical polymerization process using a conventional emulsion system. Latex particles are prepared by a conventional emulsion polymerization process, and the resultant latex particles are then selected as a host for the SFR polymerization, see *Macromolecules*, 1997, 30, 324-326.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024. All the aforementioned prior art references are incorporated herein in their entirety by reference.

In emulsion polymerization reaction processes of the prior art, various significant problems exist, for example difficulties in predicting or controlling both the polydispersity and modality of the polymers produced. These emulsion polymerization processes produce polymers with high weight average molecular weights (Mw) and low number average molecular weights (Mn) resulting in broad polydispersities or low molecular weight (Mn) and low conversion. Further, emulsion polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in Principles of Polymerization, G. Odian, 2nd Ed., Wiley-Interscience, N.Y., 1981, page 272, the disclosure of which is entirely incorporated herein by reference. Moreover, the exothermic nature of free radical emulsion polymerization processes is often a limitation that severely restricts the concentration of reactants or the reactor size upon scale up.

In the emulsion polymerization processes of the prior art, various significant problems exist, for example, difficulties in predicting or controlling both the particle size and particle size distribution of the particulate products produced.

These and other disadvantages are avoided, or minimized with the semi-emulsion polymerization processes of the present invention.

Thus, there remains a need for polymerization processes for the preparation of narrow polydispersity polymeric resins by economical and scalable free radical polymerization techniques and which polymeric resins retain many or all of their desirable physical properties, for example, hardness, low gel content, processability, clarity, high gloss durability, and the like, while avoiding the problems of gel formation, exotherms, volume limited and multi-stage reaction systems, purification, performance properties of the polymer resin products, and the like considerations associated with prior art free radical emulsion polymerization methodologies.

The semi-emulsion polymerization processes and latex resin products of the present invention are useful in many applications, for example, in a variety of specialty applications including toner resins used for electrophotographic imaging processes, marking particles and formulations used liquid imaging process, such as ink jet printing and liquid immersion development processes, and where monomodal or mixtures of monomodal narrow molecular weight resins or block copolymers with narrow molecular weight distribution within each block component, and that are suitable for use, for example, in thermoplastic films or coating technologies.

SUMMARY OF THE INVENTION

Embodiments of the present invention, include:

A process for latex preparation comprising:

a first heating of a mixture of at least one free radical polymerizable monomer compound, a free radical initiator compound, and a stable free radical compound to form a latomer mixture with from about 1 to about 8 percent conversion of the monomer compound to an oligomeric compound of the formula I—R'—SFR, wherein R' is an oligomer comprised of from about 1 to about 30 monomer units, I— is a covalently bonded free radical initiator fragment arising from the free radical initiator compound, and —SFR is a covalently bound stable free radical group;

dispersing the resulting latomer mixture in a substantially immiscible liquid with high shear to form a miniemulsion containing discrete phase droplets or particles below about 500 nanometers; and a second heating of the miniemulsion, wherein there results an unexpectedly high stability solid particle latex product which contains a resin with a high monomer to polymer conversion of from about 98 to about 100 weight percent and a narrow polydispersity of from about 1.1 to about 2.0; and Stable free radical mediated polymerization processes for the preparation of highly stable latices containing block or multiblock copolymer thermoplastic resins and as illustrated herein.

DETAILED DESCRIPTION OF THE INVENTION

The stable free radical mediated semi-emulsion polymerization processes of the present invention may be used to process and prepare a variety of polymeric materials, including toner particles for used in liquid and dry developer marking applications in a cost efficient manner. An advantage of the present invention is that the processes thereof afford control over the particle size, particle size distribution properties of the resulting fine particulate products, and precise control over the molecular weight and molecular weight distribution properties of the resulting polymer products. Additionally, the present invention overcomes problems encountered in the prior art methodologies by providing superior latex formation processes with substantially quantitative conversion, or yield, of polymer product and with unexpectedly low residual monomer.

In an embodiment, the present invention relates to a stable free radical moderated semi-emulsion polymerization process for producing a thermoplastic polymer resin or resins, that have narrow polydispersities, that is, narrow molecular weight distributions as defined by the ratio Mw:Mn, where Mw is weight average molecular weight of the polymer and Mn is number average molecular weight of the polymer, with an easily controlled modality, from at least one monomer compound comprising heating for an effective period of time a bulk or neat mixture, that is free of, discontinuous phase solvents or diluents, of a free radical initiator, a stable free radical agent, and at least one substantially water insoluble polymerizable monomer compound under such conditions that all polymer chains are initiated at about the same time;

In another embodiment polymeric chain growth proceeds by a pseudoliving mechanism and can provide resins of variable molecular weights from very low to very high, for example, less than about 10,000 up to about 200,000 while maintaining narrow molecular weight distributions or polydispersities. In another embodiment block and multiblock copolymers can be synthesized by the aforementioned stable free radical moderated semi-emulsion polymerization processes by repeated or iterative application of monomer addition and heating, wherein each block formed is well defined in length by the added and reacted monomer and wherein each additional block that is formed also possesses a narrow molecular weight distribution.

The stable free radical mediated semi-emulsion polymerization system of the present invention can readily afford narrow polydispersities, in embodiments, of from about 1.5 to about 3.0, and in embodiments, of from about 1.15 to about 1.25 for polystyrene, and as low as 1.5 or below for various copolymer systems. Stable free radical mediated semi-emulsion polymerization systems of the present invention afford resin polydispersities that are comparable to those obtained, for example, in anionic polymerizations.

Thus in embodiments of the present invention there is provided a process for latex preparation comprising:

a first heating of a mixture of at least one free radical polymerizable monomer compound, a free radical initiator compound, and a stable free radical compound to form a latomer mixture with from about 1 to about 8 percent conversion of the monomer compound to an oligomeric compound of the formula I—R'—SFR, wherein R' is an oligomer comprised of from about 1 to about 30 monomer units, I— is a covalently bonded free radical initiator fragment arising from the free radical initiator compound, and —SFR is a covalently bound stable free radical group;

dispersing the resulting latomer mixture in a substantially immiscible liquid, such as water or aqueous mixtures of liquids that do not dissolve the monomer or prepolymer resin contained in the latomer mixture, with high shear to form a miniemulsion; and a second heating of the miniemulsion, wherein there results a high stability solid particle latex which contains a resin with a high monomer to polymer conversion of from about 98 to about 100 weight percent and a narrow polydispersity of from about 1.1 to about 2.0. The high stability of the resulting particle latex was unexpectedly observed to be from about 1 to about 12 months at ambient or room temperatures, for example, about at least 8 months and longer at about 20 to about 30° C.

The miniemulsion can contain, for example, from about 10 to about 25 weight percent of the latomer mixture, preferably from about 15 to about 25 weight percent of the latomer mixture, and more preferably from about 18 to about 22 weight percent of the latomer mixture based on the weight of miniemulsion. The latomer content in the miniemulsion dispersion may be alternatively referred to as an "organic phase", a "discontinuous or discrete phase", "the solids" or "solids contents", and the like expressions known in the art, although it is readily apparent to one of ordinary skill in the art that the latomer mixture, either before or after polymerization, need not necessarily be a solid material and can be, for example, a separable liquid, gel, semi-solid, and the like physical states, depending upon, for example, the nature of the monomer and oligomer mixtures, the nature of the resulting latex, the temperature, the extent of conversion, the presence of surfactants or cosurfactants, and the like considerations. It is also readily apparent to one of ordinary skill in the art that the various terms, such as miniemulsion, microemulsion, or emulsion, used to describe the present invention are not intended to be limited or confined to their conventional definitions, rather these terms are used to refer to a dispersion or dispersed phase that is contained in a continuous phase. The disperse phase can be the monomer, latomer mixture, that is predominantly monomer plus small amounts of oligomer, or polymer latex particles, depending upon the stage of preparative process and as illustrated herein. Irrespective of the label selected for a particular reaction mixture or product, the dispersed phase is characterized by droplets or particles which have an average particles size ranging from about 10 to about 500 nanometers and smaller ranges therein.

The first heating of the mixture is free of a solvent, that is, neat. The first heating can be at a temperature of from about 110 to about 145° C. for from about 5 minutes to about 2 hours, and preferably from about 20 minutes to about 1 hour. The second heating can be at a temperature of from about 120 to about 160° C. for from about 2 hours to about 40 hours. The heating conditions can vary depending on, for example, the scale of the reaction and the results desired.

The latomer mixture can contain, for example, from about 1 to about 8 weight percent, preferably about 1 to about 6 weight percent, and more preferably from 1 to about 5 weight percent of the conversion product or products of monomer to polymer, that is, of the aforementioned oligomeric compound, based on total weight of latomer mixture.

In embodiments, the miniemulsion preferably includes a surfactant component in an amount of from about 1 to about 7 weight percent, preferably from about 2 to about 5 weight percent, and more preferably about 2 to about 3 weight percent based on the weight of the original monomer content. Preferred surfactant are ionic surfactants, such as anionic or cationic surfactants. More preferred surfactants are mixtures of anionic and cationic surfactants. Most preferred surfactants are anionic surfactants, such as alkyl sulfonate salts or arylalkyl sulfonate salts, for example, sodium dodecylbenzenesulfonate (SDBS).

In the above embodiments there can be included in the miniemulsion reaction mixture a co-surfactant. The cosurfactant acts to reduce Oswald ripening and maintain the desired size and number of particles. Otherwise instability of the dispersed monomer droplets could result in latex failure or poor reproducibility of the process. The miniemulsion can further include a cosurfactant component such as hydrocarbons, alcohols, mercaptans, carboxylic acids, ketones, and amines hydrocarbon compounds, wherein the cosurfactant can be in a mole ratio of from about 0.004 to about 0.08 with respect to the monomer compound, a mole ratio of from about 0.1 to about a 10 with respect to surfactant, and wherein the cosurfactant can further prevent Oswald ripening phenomena of the miniemulsion droplets which ripening can lead to instability of the dispersed monomer droplets and cause latex instability, latex failure, or poor reproducibility of the process. The miniemulsion can further include a buffer such as alkali metal carbonates, alkaline earth carbonates, alkali metal bicarbonates, acetates, borates, and the like buffers, and mixtures thereof.

In embodiments, the miniemulsion can be formed in a variety of high shear mixing devices, for example, a piston homogenization, a microfluidizer, a polytron, an ultrasonicator, and the like devices. In embodiments, the miniemulsion is preferably formed in a piston homogenizer at from about 1 to about 60 minutes at a pressure of about 1,000 to about 30,000 psi. The miniemulsion prior to the first heating is comprised of droplets of the oligomer and monomer with a volume average diameter, for example, of from about 100 to about 400 nanometers. The miniemulsion of the latomer mixture prior to the second heating is comprised of droplets of the oligomer and monomer with a volume average diameter, for example, of from about 25 to about 500 nanometers.

The oligomeric compound, I—R'—SFR, in the latomer mixture can be, for example, of the formula

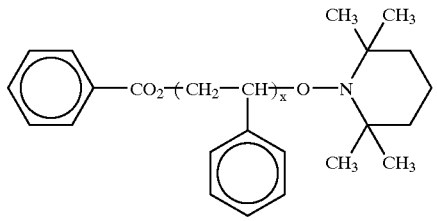

where x is an integer of from 1 to about 30.

The monomer compound can be, for example, known free radical polymerizable monomers, preferably unsaturated monomers, such as styrene compounds, conjugated compounds, acrylates compounds, 9-vinyl carbazole compounds, vinyl chloride compounds, vinyl acetate compounds, and the like monomers, and mixtures thereof. More specifically the monomer can be styrene, alkyl substituted styrenes with from 1 to about 20 carbon atoms, butadiene, alkyl methacrylate, and the like compounds, and mixtures thereof. In embodiments, there can be selected from about 2 to about 5 different monomers for inclusion in the first mixture and polymerized during the first heating.

The free radical initiator compound can be, for example, any suitable known free radical initiator compound, such as peroxide compounds, diazo compounds, persulfates, and the like compounds, and mixtures thereof. The free radical initiator compound is preferably completely miscible in the monomer and the latomer mixture and has preferably low or no continuous phase miscibility.

The covalently bonded stable free radial end group, —SFR, can be obtained from a compound such as of 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and the like known compounds and mixtures thereof. Other —SFR groups and compounds are illustrated in the appropriate U.S. patents recited herein, such as non-nitroxyl compounds disclosed in U.S. Pat. No. 5,530,079.

In embodiments, polymerization processes of the present invention can further include separating the solid latex particles from the liquid phase in the resulting latex and which separation can be accomplished by conventional methods, such as, filtration, sedimentation, spray drying, and the like known methods.

The weight average molecular weight (Mw) of the resulting resin can be, for example, from about 3,000 to about 200,000, and preferably 10,000 to about 150,000. The resulting resin can have a narrow polydispersity, for example, of from about 1.05 to about 1.45 and a high monomer to polymer conversion of from about 99 to about 100 percent.

In other embodiments of the present invention there is provided a process for the preparation of a block or multiblock copolymer resin comprising:

preparing a latex resin in accordance with the aforementioned semi-emulsion process to form a first mixture containing a latex;

optionally isolating latex particles from the first mixture;

adding to the latex at least one polymerizable second monomer compound, wherein the polymerizable second monomer compound is different from the polymerizable monomer or monomers of the resin in the latex, to form a combined second mixture;

a third heating of the combined second mixture to form a third mixture comprised second latex particles containing a block copolymer resin comprised of a first product resin and the added said second monomer;

cooling the resulting third mixture;

optionally isolating the block copolymer resin particles from the third mixture;

optionally sequentially repeating the preceding three steps of adding, heating and cooling, N times, wherein N represents the number of times the sequence is repeated, to form a fourth mixture containing multiblock copolymer resin particles having N+2 blocks;

optionally isolating the multiblock copolymer resin particles from the fourth mixture; and optionally washing and drying the multiblock copolymer resin particles and wherein the multiblock copolymer resin possesses a narrow polydispersity and a modality of about 1.

In embodiments the resulting polymerized miniemulsion particles can be further transformed by, for example, repeatedly reacting the resulting product particles with successively added monomers and which monomers are different from the previously polymerized monomer to form well defined block or multiblock copolymer thermoplastics as illustrated herein. In embodiments the aforementioned N value can be, for example, from 1 to about 20 and the polydispersity can be, for example, from about 1.1 to about 1.6.

In embodiments, the miniemulsion can further include a cosurfactant, for example, compounds that have a low water solubility, or are substantially insoluble, such as long chain hydrocarbons with from 10 to about 40 carbon atoms, and preferably from about 15 to about 25 carbon atoms, alcohols, mercaptans, carboxylic acids, ketones, amines, or any other long chain molecules, with or without functional groups that do not substantially interfere with the SFR or semi-emulsion chemistry, for example, dodecyl mercaptan, hexadecane, cetyl alcohol, and the like, and mixtures thereof, wherein the cosurfactant is in a mole ratio of, for example, from about 0.004 to about 0.08, and preferably from about 0.005 to about 0.05 with respect to the monomer compounds, a mole ratio of from about 0.1 to about a 10, and preferably from about 0.5 to about 5.0 with respect to surfactant. In embodiments, the cosurfactant can be a linear or branched hydrocarbon with from about 5 to about 40 carbon atoms, a linear or s branched aliphatic alcohol with from about 5 to about 40 carbon atoms, wherein the cosurfactant is in a mole ratio of from about 0.01 to about 0.04 with respect to the monomer compounds, a mole ratio of from about 0.5 to about 6.0 with respect to the surfactant, and wherein the cosurfactant prevents, or minimizes coalescence of the miniemulsion droplets. In embodiments, the cosurfactant is in a mole ratio of from about 0.012 to about 0.025 with respect to the monomer compounds, and wherein the cosurfactant prevents coalescence of the miniemulsion droplets.

When a free radical initiator compound is selected as the initiator component in forming the oligomeric compound of the present process, it can be any free radical polymerization initiator capable of initiating a free radical polymerization process and forming the oligomeric compound, and includes peroxide initiators such as benzoyl peroxide and azo initiators such as azobisisobutyronitrile, and the like. The initiator concentration employed in forming the oligomeric compound, for example, is about 0.2 to 2.5 weight percent, of the total weight of monomer to be polymerized and is determined by the desired molecular weight and structure of the oligomer and the desired resin. As the initiator concentration is decreased relative to the weight of molar equivalents of monomer used, the molecular weight of the thermoplastic resin product increases.

Suitable surfactants which can be employed in the practice of the present invention include anionic, cationic, amphoteric, and nonionic emulsifiers customarily used in emulsion polymerization. In a preferred embodiment, the surfactant is selected from ionic surfactants, which class of surfactants are generally better suited to the higher temperatures associated with the present processes. Representative types of anionic emulsifiers are the alkylaryl sulfonates, alkali metal alkyl sulfates, the sulfonated alkyl esters, the fatty acid soaps, and the like, such as sodium alpha-olefin ($C_{14}$–$C_{16}$) sulfonates. Particularly preferred surfactants are alkali metal alkylaryl sulfonates. The surfactant can be employed in varying amounts providing that adequate miniemulsification is achieved by, for example, exceeding the critical micelle concentration (CMC). As a general rule, the surfactants can be present in an amount of from about 1 to about 5 weight percent, preferably from about 2 to about 5 weight percent, and more preferably from about 2 to about 3 weight percent, based on the total weight of monomer to be polymerized. A listing of various other suitable surfactants which may be useful in the invention process is found in the book "McCutcheon's Emulsifiers and Detergents 1981 Annuals", which is incorporated by reference herein in its entirety.

Cosurfactants can be optionally added to further minimize diffusion due to Oswald ripening. Cosurfactants, in embodiments, are typically highly water insoluble compounds, such as hexadecane and cetyl alcohol, and are used in molar ratios of about 0.01 to about 10, and preferably from about 0.1 to about 5 based on the surfactant. Alternatively, high polymer, activator compounds, can be added in minor amounts to enhance droplet nucleation as well as minimize Oswald ripening. Activators are typically used in amounts of from about 0.01 to about 2 weight percent based on monomer. The molecular weight of the activator, in embodiments, can range from about 25,000 to about 500,000, and preferably from about 50,000 to about 250,000.

The molar ratio of the stable free radical (SFR) agent to free radical initiator (INIT) residing in the same phase is from about 0.4 to 2.5, and preferably in the range from about 0.9 to 1.6. Although not wanting to be limited by theory, in an embodiment, the molar ratio [SFR:INIT] of stable free radical agent, for example, TEMPO, to free radical initiator, for example, benzoyl peroxide, of about 1.3 is believed to be important for success of the process. If the [SFR:INIT] is too high then the reaction rate is noticeably inhibited. If the [SFR:INIT] is too low then the reaction product has undesired increased polydispersity.

In embodiments, the molar ratio of monomer content to stable free radical agent to free radical initiator is from about 100:0.2:1 to about 10,000:2.5:1 and preferably in the range of about 300:1.3:1 to about 7,000:1.3:1.

Processes of the instant invention, in embodiments, provide for high monomer to polymer conversion levels, or degrees of polymerization, for example, of about 90 percent by weight or greater, preferably from about 95 to about 100 percent, and more preferably from about 98 to about 100 percent.

The polymeric products of the present invention may be optionally crosslinked with, for example, known crosslinking or curing agents such as divinyl benzene and the like, either in situ or in a separate post polymerization process step.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

In embodiments, there can be incorporated into the monomer before or during the bulk or semi-emulsion polymerization processes a waxy component, such as alkylenes, like polyethylene, polypropylene waxes, and mixtures thereof having a low molecular weight of from between about 1,000 to about 20,000 in amounts of from about 0.1 to about 15 weight percent of the total monomer polymerized. Alternatively, the waxy component may be added to the isolated polymeric product of the process. The use of such a component may be desirable for certain toner applications. Suitable low molecular weight waxes are disclosed in U.S.

Pat. No. 4,659,641, the disclosure of which is totally incorporated herein by reference.

Toner compositions can be prepared by a number of known methods, such as admixing and heating resin, or polymer particles obtained with the processes of the present invention such as water soluble or insoluble styrene butadiene copolymers, colorants, such as pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter. Alternatively, the toner compositions are ground with a fluid bed grinder equipped with a classifier wheel constructed in accordance with the present invention, and then classified using a classifier equipped with a classifier wheel constructed in accordance with the present invention. In embodiments, a toner can be prepared directly, thereby foregoing the extensive particle sizing and separation process by including, for example, a suitable colorant in the miniemulsion droplets prior to polymerization, and thereafter isolating the resulting colored toner particles.

Illustrative examples of resins suitable for toner and developer compositions include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable colorants, such as pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 10 percent by weight, and preferably in an amount of from about 0.1 percent by weight to about 5 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be themselves surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methyl methacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, more preferably from about 8 to about 12 microns, and most preferably from about 5 to about 8 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared, in embodiments, of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that the Examples are intended to be illustrative only and that the invention is not intended to be limited to the materials, conditions, process parameters, and the like, recited herein. Parts and percentages are by weight unless otherwise indicated.

Comparative Example I

Stable Free Radical Mediated Emulsion Polymerization

A nonionic surfactant, POLYSTEP OP-3070 (5.20 gm, available from Stephan Chemical Co.) was mixed with 120 mL of water and stirred on a magnetic stirrer for 10 minutes.

A stable free radical agent, 2,2,6,6-tetramethylpiperidinyloxy radical (TEMPO, 0.329g), was dissolved in 30 gm of styrene and then added to the surfactant solution, and stirred for about 20 minutes with magnetic stirring. A free radical initiator, potassium persulfate (0.505 gm) was then added. The resulting emulsion was transferred to a PARR® reactor and stirred at 200 rpm and purged with argon for several minutes. The reactor was then heated to 135° C. for 4 hours. Upon cooling the reaction mixture, a milky white latex, a white solid precipitate immediately settled out. The precipitate was isolated by filtration, washed and dried. The precipitate was analyzed by GPC and found to be polymer with a Mw of 10,765 with a polydispersity of 1.14. The unreacted monomer content in the crude reaction mixture was 26% by weight based on the original monomer amount as measured by GPC.

Comparative Example II

Stable Free Radical Mediated Miniemulsion Polymerization

A nonionic surfactant, POLYSTEP OP-3070 (1.25 gm), available from Stephan Chemical Co., was mixed with 80 mL of water and stirred on a magnetic stirrer for 10 minutes. Hexadecane (0.87 gm) and 2,2,6,6-tetramethylpiperidinyloxy radical (TEMPO, 0.09 gm) were dissolved in 20 gm of styrene, added to the surfactant solution, and stirred for 20 minutes with magnetic stirring. The mixture was then piston homogenized for 3 minutes at 6,000 psi resulting in a milky white latex. To the latex was added 0.131 gm of potassium persulfate. The latex was transferred to a PARR reactor and stirred at 200 rpm while being purged with argon for several minutes. The reactor was then heated to 135° C. for 3 hours. Upon cooling a milky white latex with no oil layer on top and no fouling was immediately observed. However, there was observed considerable latex instability, for example, upon standing at room temperature over several days the latex particles substantially separated from the continuous phase. Additionally, these formulations were found to have a narrow molecular weight latitude, that is, they only permitted the preparation of relatively low molecular weight polymers, for example, with an Mn of from about 10,000 to about 40,000. The polymer in the separated latex particles was analyzed by GPC and found to have a Mw of 25,777 with a polydispersity of 1.34. The monomer content of the latex was measured and found to be less than about 2,500 ppm or about 1 weight percent.

Comparative Example III

Stable Free Radical Oligomer Mediated Miniemulsion Polymerization

A TEMPO terminated styrene oligomer (0.155 gm, Mn 1,216, polydispersity=1.08) prepared as disclosed in the aforementioned commonly owned U.S. Pat. No. 5,332,912 was dissolved in 22 mL of styrene and 0.753 gm of hexadecane was then added. This solution was added to 0.25 gm of sodium lauryl sulfate and 0.004 gm of sodium bicarbonate dissolved in 79 mL of water. The resulting mixture was stirred with magnetic stirring for 20 minutes. It was the passed through a piston homogenizer (Union Pump Model HTD1) for 2 minutes operating at an inlet pressure of 6,000 psi. The resulting milky white fluid was then transferred to a PARR reactor and purged with argon for 5 minutes while stirring at 156 rpm. The purging was stopped and the temperature was increased to 125° C. and maintain at that temperature for 4 hours. The resulting product was a milky white latex with a small oil layer on the surface thereof which layer was identified as unreacted monomer. The unreacted monomer was readily separated by gravity and the latex was analyzed by GPC and indicated that Mw=49,910, Mn=40,159, Mp=52,603, and polydispersity PD=1.24. The conversion was about 50 percent.

Comparative Example IV

Stable Free Radical Mediated Miniemulsion Polymerization

A TEMPO terminated styrene oligomer (0.90 gm, Mn 1,387, polydispersity=1.06) prepared as disclosed in the aforementioned commonly owned U.S. Pat. No. 5,332,912 was dissolved in 22 mL of styrene and 0.883 gm of hexadecane was then added. This solution was added to 1.28 gm of Polystep OP-3070 dissolved in 80 mL of water. The resulting mixture was stirred with magnetic stirring for 20 minutes. It was the passed through a piston homogenizer (Union Pump Model HTD1) for 3 minutes operating at an inlet pressure of 6,000 psi. The resulting milky white fluid was then transferred to a PARR reactor and purged with argon for 5 minutes while stirring at 156 rpm. The purging was stopped and the temperature was increased to 135° C. and maintain at that temperature for 3 hours. The resulting product was a milky white latex which was analyzed by GPC and indicated that Mw=15,660 Mn=11,808 Mp=18,180, and polydispersity PD=1.33. The reaction was repeated except that the reaction time was increased from 3 hours to 6 hours. After 6 hours of polymerization a milky white latex was obtained which was analyzed by GPC and indicated that the polymer had a Mw=27,207, Mn=21,926, Mp=31,173. The conversion was about 75 percent.

Comparative Example V

Stable Free Radical Mediated Miniemulsion Polymerization with Reduced Surfactant Concentration To a 2 weight percent solution of SDBS (2 gm) in water (198 gm) was added 43 ml of the latomer of Example II. This was then microfluidized with 2 passes at 18,000 psi resulting in an emulsion. This was transferred to a 300 mL PARR reactor and deoxygenated by pressurizing/depressurizing for 10 times with argon. This was then heated and maintained at 135° C. for 7 hours. Upon cooling there was obtained a stable emulsion from which a solid polymer particles was isolated which contained some oil droplets with particle size about 150 nanometers, Mn=22,800, PD=1.18, and a residual monomer content of 24,000 ppm, or about 14 weight percent based on the original monomer content, and a conversion of monomer to polymer of about 86 weight percent. Although not wanting to be limited by theory it is believed that the considerably lower conversion result is attributable to the lower surfactant concentration, and presumably the accompanying reduced stability of the particles.

Comparative Example VI

Stable Free Radical Mediated Miniemulsion Polymerization with High Solids Content To a 200 mL round-bottom flask was added styrene (100 mL), TEMPO (0.78 gm, 5 mmole) and benzoyl peroxide (BPO, 0.968 gm, 4.0 mmole). The solution was deoxygenated by bubbling argon through the solution for 20 minutes and then heated to 135° C. by immersion in a preheated oil bath. The solution was maintained at temperature for 1.5 hours, cooled and then 50 mL of the resulting latomer mixture which is equivalent to a discontinuous phase or solids content of about 31 weight percent was added to a solution of sodium dodecylbenzenesulfonate (SDBS, 3.1gm) in water (100 mL). The mixture was then passed through a piston homogenizer for 30 seconds at 150 barr. The resulting white emulsion was transferred to a 300 mL PARR reactor and then deoxygenated by pressurizing/depressurizing 10 times with argon gas. The miniemulsion was then heated to 135° C. and maintained at that temperature for 4 hours. The reactor was cooled and there was isolated a stable emulsion with an average particle size of about 200 nm, Mn=18,000, PD=1.24, and residual monomer content of 28,000 parts per million, or about 8 weight percent monomer, and a monomer to polymer conversion of only 91 percent. Although not wanting to be limited by theory it is believed that the considerably lower conversion result obtained is attributable to the relatively high discontinuous phase or solids content or lower relative surfactant concentration and presumably the accompanying reduced stability of the particles.

EXAMPLE I

Semi-emulsion Polymerization—Partial Bulk Polymerization followed by Miniemulsion Polymerization To a 100 ml round-bottom flask was added styrene (25 mL), TEMPO (0.195gm, 1.25 mmole), and benzoyl peroxide (BPO, 0.242 gm, 1.0 mmole). The solution was deoxygenated by bubbling argon through the solution for 20 minutes and then heated to 135° C. by immersion in a preheated oil bath. The solution was maintained at temperature for 1 hour, cooled and the resulting latomer mixture was added to a solution of sodium dodecylbenzenesulfonate (SDBS, 3.1 g) in water (100 mL). This was then passed through a piston homogenizer for 30 seconds at about 1,000 bar or about 20,000 psi. The resulting white emulsion of the latomer mixture was then transferred to a 300 mL PARR reactor and then deoxygenated by pressurizing/depressurizing 10 times with argon gas. This was then heated to 135° C. and maintained at that temperature for 6 hours to complete the polymerization of monomer and oligomers in the latomer mixture. The reactor was cooled and gave a stable polystyrene latex emulsion with an average particle size of about 200 nm, Mn=18,000, PD=1.24 and residual styrene monomer content of 700 parts per million or about 0.3 weight percent and a conversion of about 99.7 weight percent based on the weight of monomer. The resulting latex emulsion was found to be unexpectedly stable against particle separation at room temperature, for example, from about 20 to about 30° C., for at least 8 months and expectedly longer.

EXAMPLE II

Semi-emulsion Polymerization—Bulk Polymerization Masterbatch Latomer Preparation A large masterbatch of limited conversion bulk polystyrene was prepared by adding to a 2 liter round-bottom flask styrene (1 L), BPO (9.681 gm, 39.9 mmole) and TEMPO (7.808 g, 50.1 mmole). This was deoxygenated by bubbling argon through the solution for 40 minutes and then heated to 135° C. for 1 hour. There resulted a latomer mixture containing about 95 weight percent monomer and about 5 weight percent polystyrene polymer of Mn=1,100, that is a 95:5 by weight mixture of monomer and styrene oligomer with a styrene conversion of about 5 percent by weight based on the total weight of the monomer.

EXAMPLE III

Semi-emulsion Polymerization—Miniemulsion Polymerization

To a solution of SDBS (23 gm) in water (1 L) was added 300 ml of Example II. This was then microfluidized for 2 passes at 15,000 psi resulting in an emulsion. This was transferred to a 2 L PARR reactor and deoxygenated by pressurizing/depressurizing for 10 times with argon. This was then heated and maintained at 135° C. for 6 hours. Upon cooling a stable emulsion polymer was isolated with particle size about 150 nm, Mn=19,300 PD=1.33 and residual monomer content of 2,400 ppm or about 0.2 weight percent and a conversion of about 99.8 weight percent based on the weight of monomer. The resulting latex emulsion was found to be unexpectedly stable against particle separation at room temperature, for example, from about 20 to about 30° C., for at least 8 months and expectedly longer.

EXAMPLE IV

Semi-emulsion Polymerization

To a 250 ml round-bottom flask was added styrene (47 mL), n-butyl acrylate (75 mL), TEMPO (stable free radical agent, 0.255 gm, 1.63 mmole), and BPO(benzoyl peroxide free radical initiator, 0.242 gm, 1.0 mmole). The solution was deoxygenated by bubbling argon through the solution for 45 minutes and then heated to 135° C. by immersion in a preheated oil bath. The solution was maintained at temperature for about 2 hours, cooled, and then added to a solution of sodium dodecylbenzenesulfonate (SDBS, 6 gm) in water (200 mL). This was then microfluidized with 3 passes at 20,000 psi. Two hundred milliliters (200 mL) of the resulting white emulsion was then transferred to a 300 mL PARR® reactor and then deoxygenated by pressurizing/depressurizing 10 times with argon gas. This was then heated to 135° C. and maintained at that temperature for 7 hours. The reactor was cooled and gave a stable emulsion of poly (styrene-co-n-butylacrylate) with particle size of about 200 nm, Mn=29,800, PD=1.24, and residual monomer content of styrene of about 8,000 ppm and n-butylacrylate of about 2,400 ppm, or about 1 and 3 weight percent respectively, and are indicative of respective conversions of about 99 and about 97 weight percent based on the weight of starting monomers. The resulting latex emulsion was found to be unexpectedly stable against particle separation at room temperature, for example, from about 20 to about 30° C. for at least 8 months and expectedly longer.

EXAMPLE V

Semi-emulsion Polymerization for Preparing Latices Containing High Molecular Weight Polymers To styrene (50 mL) was added 5 mL of a Example II and this solution was added to a solution of SDBS (6 gm) in 194 mL of water. The mixture was microfluidized for 3 passes at 14,000 psi and then sealed in a 300 mL PARR reactor. The reactor was pressurized and depressurized 10 times with argon gas and then heated to 135° C. for 6 hours. The resulting latex emulsion was analyzed and found to contain polystyrene polymer particles with a Mn=144,000, and a PD=1.44. Conversion measured by GC was about 92 percent, with a residual styrene monomer content of about 16,800 ppm, or about 8 weight percent of styrene.

EXAMPLE VI

Block Copolymer Formation within the Latex Particles

To 150 mL of latex prepared in accordance with Example 1 was added 10 mL of n-butyl acrylate monomer and stirred for from about 0.5 hours to about 12 hours at room temperature under an argon atmosphere to swell the styrene latex particles with the added monomer. The mixture was heated to 135° C. for about 6 hours and cooled. A stable latex was obtained and GPC analysis showed an increase in molecular weight of the polymer from about 18,800 (PD=1.24) for the polystyrene polymer to about 27,600 (PD=1.16) for the poly(styrene-b-n-butyl acrylate) block copolymer. The residual n-butyl acrylate monomer was about 4,700 ppm, or about 1.5 weight percent of the original n-butyl acrylate monomer, and represented a conversion of about 98.5 weight percent. The resulting latex emulsion was found to be unexpectedly stable at room temperature against particle separation for at least 8 months and expectedly longer.

Other modifications of the present invention may occur to those skilled in the art based upon a review of the present application and these modifications, including equivalents thereof, are intended to be included within the scope of the present invention.

What is claimed is:

1. A process for latex preparation comprising:
   a first heating of a mixture of at least one free radical polymerizable monomer compound, a free radical initiator compound, and a stable free radical compound to form a latomer mixture with from about 1 to about 8 percent conversion of the monomer compound to an oligomeric compound of the formula I—R'—SFR, wherein R' is an oligomer comprised of from about 1 to about 30 monomer units, I— is a covalently bonded free radical initiator fragment arising from the free radical initiator compound, and —SFR is a covalently bound stable free radical group;
   dispersing the resulting latomer mixture in an immiscible liquid with high shear to form a miniemulsion; and
   a second heating of the miniemulsion, wherein there results a high stability polymer particle latex which contains a polymer with a high monomer to polymer conversion of from about 98 to about 100 weight percent and a narrow polydispersity of from about 1.1 to about 2.0.

2. A process in accordance with claim 1, wherein the high stability of the resulting polymer particle latex is from about 1 to about 12 months at about 20 to about 30° C.

3. A process in accordance with claim 1, wherein the latomer mixture contains of from about 1 to about 6 weight percent of the oligomer based on total weight of latomer mixture.

4. A process in accordance with claim 1, wherein the miniemulsion contains from about 15 to about 25 weight percent of the latomer mixture based on the weight of miniemulsion.

5. A process in accordance with claim 1, wherein the first heating is at a temperature of from about 110 to about 145° C. for from about 5 minutes to about 2 hours, and the second heating is at a temperature of from about 120 to about 160° C. for from about 2 hours to about 40 hours.

6. A process in accordance with claim 1, wherein the miniemulsion further comprises an anionic surfactant in an amount of from about 2 to about 5 weight percent based on the weight of monomer.

7. A process in accordance with claim 1, wherein the miniemulsion further comprises a cosurfactant selected from the group consisting of hydrocarbons, alcohols, mercaptans, carboxylic acids, ketones, and amines hydrocarbon compounds, wherein the cosurfactant is in a mole ratio of from about 0.004 to about 0.08 with respect to the monomer compound, a mole ratio of from about 0.1 to about a 10 with respect to surfactant, and wherein the cosurfactant prevents Oswald ripening phenomena of the miniemulsion droplets.

8. A process in accordance with claim 1, wherein the miniemulsion further comprises a buffer selected from the group consisting of alkali metal carbonates, alkaline earth carbonates, alkali metal bicarbonates, acetates, borates, and mixtures thereof.

9. A process in accordance with claim 1, wherein the high shear is accomplished in a piston homogenizer for about 1 to about 60 minutes at a pressure of about 1,000 to about 30,000 psi.

10. A process in accordance with claim 1, wherein the miniemulsion prior to the second heating is comprised of droplets with a volume average diameter of from about 25 to about 500 nanometers and contain a mixture of the oligomer and monomer.

11. A process in accordance with claim 1, wherein the oligomeric compound I—R'—SFR is of the formula

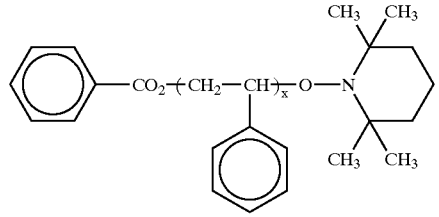

where x is an integer of from 1 to about 30.

12. A process in accordance with claim 1, wherein the first heating mixture is free of a discontinuous phase solvent.

13. A process in accordance with claim 1 wherein from about 2 to about 5 different monomers are polymerized during the first heating.

14. A process in accordance with claim 1 wherein the weight average molecular weight (Mw) of the resulting polymer is from about 3,000 to about 200,000.

15. A process in accordance with claim 1 wherein the polymer has a narrow polydispersity of from about 1.05 to about 1.45 and a monomer to polymer conversion of from about 99 to about 100 percent.

16. A process in accordance with claim 1 wherein the covalently bound stable free radical group —SFR arises from a compound selected from the group consisting of 2,2,5,5-tetramethyl-1-pyrrolidinyloxy compounds, 2,2,6,6-tetramethyl-1-piperidinyloxy compounds, 4,4-dimethyl-3-oxazolinyloxy compounds, di-tertiary alkyl substituted nitroxide compounds, and mixtures thereof.

17. A process in accordance with claim 1, wherein the monomer compound is selected from the group consisting of styrene compounds, conjugated compounds, acrylates compounds, 9-vinyl carbazole compounds, vinyl chloride compounds, vinyl acetate compounds, and mixtures thereof.

18. A process in accordance with claim 1, wherein the free radical initiator compound is selected from the group consisting of peroxide compounds, diazo compounds, persulfate compounds, and mixtures thereof.

19. A process for the preparation of a block or multiblock copolymer resin comprising:

preparing a latex resin in accordance with claim 1 to form a first mixture;

optionally isolating the latex particles from the first mixture;

adding to the latex at least one polymerizable second monomer compound, wherein the polymerizable second monomer compound is different from the polymerizable monomer or monomers of the resin in the latex, to form a combined second mixture;

a third heating of the combined second mixture to form a third mixture comprised latex particles containing a block copolymer resin comprised of a first product resin and the added said second monomer;

cooling the resulting third mixture;

optionally isolating the resin particles from the third mixture;

optionally sequentially repeating the preceding three steps of adding, heating and cooling, N times, wherein N represents a number, to form a fourth mixture containing a multiblock copolymer resin or resins having N+2 blocks and wherein N is the number of times the sequence is repeated;

optionally isolating the multiblock copolymer resin particles from the fourth mixture; and optionally washing and drying the multiblock copolymer resin particles and wherein the multiblock copolymer resin possesses a narrow polydispersity and a modality of 1.

20. A process in accordance with claim 19, wherein N is from 1 to about 20 and the polydispersity is from about 1.1 to about 1.6.

* * * * *